Patented Jan. 15, 1946

2,393,152

UNITED STATES PATENT OFFICE 2,393,152

ALKYLATION

Carleton Ellis, Montclair, N. J., assignor to Standard Oil Development Company, a corporation of Delaware No Drawing. Application July 16, 1940,
Serial No. 345,854

9 Claims. (Cl. 260—683.4)

This invention relates to alkylation products and process of making same, and relates especially to the formation of isoparaffins from an open chain olefin hydrocarbon and a tertiary hydrocarbon saturate. It also involves the interaction of such unsaturated and saturated hydrocarbons in the presence of activating sulfuric acid containing an alkylation-promoting agent.

Interaction of olefinic hydrocarbons and tertiary hydrocarbon saturates in the presence of activating sulfuric acid is inhibited by a number of substances. These inhibitors include compounds of members of group VB of the periodic table, e. g., arsenic compounds, and also members of group IIIB of the periodic table, such as aluminum or compounds of boron. Therefore, I prefer to use sulfuric acid which is substantially free from compounds such as those mentioned above. Also, I prefer to carry out alkylation operations in vessels which are made of materials substantially devoid of inhibiting substances. Apparently the inhibiting action of the above named substances, upon alkylation operations, is observed whether the activator poison is present in its elemental form, as, for example, aluminum, or in a compound such as boric acid.

Alkyl sulfates, both the acid derivative and those of a dibasic character, for example, diisopropyl sulfate, likewise tend to retard or repress the alkylation reaction. The organic sulfates which exhibit an inhibiting effect on alkylation are those in which the hydrocarbon chain is relatively short, as for example, of the order of 3, 4, 5 carbon atoms or thereabout. Alkyl hydrogen sulfates and dialkyl sulfates may be formed during the alkylation step by union of sulfuric acid with the olefin hydrocarbon charging stock. However, the inhibiting effect of such sulfate compounds is overcome apparently to a substantial degree, according to my invention, by certain agents which promote the alkylation reaction, i. e., combination of olefin and paraffin. I do not wish to infer that the alkylation-promoting agents herein disclosed completely suppress formation of alkyl hydrogen sulfates and dialkyl sulfates. On the other hand, I do find that certain agents promote the alkylation reaction, thereby overcoming to marked extent the inhibiting effect of the alkyl hydrogen sulfates and dialkyl sulfates.

Alkylation-promoting agents, according to my invention, include the elements of group VIB of the periodic table, e. g., sulfur, selenium, or tellurium. These elements may be employed individually as promotorial agents for alkylation of tertiary hydrocarbon saturates with open chain olefins in the presence of activating sulfuric acid. On the other hand, two or more of the promotorial agents, if desired, may be employed simultaneously or in any manner suitable to the particular set of reactants, temperature, pressure, and other variables. The use of elements of group VIB of the periodic table as alkylation promoting agents is disclosed and claimed in copending divisional application Serial No. 450,620, filed July 11, 1942. Other alkylation-promoting agents suitable for my purpose comprise halides of the metals of groups IIB and IIIB of the periodic table, as, for example, aluminum chloride. Further, I have observed that wetting, emulsifying and frothing agents act as promoters or accelerating agents for alkylation of saturated hydrocarbons containing tertiary carbon atoms with open chain olefinic hydrocarbons in the presence of activating sulfuric acid. Examples of such promoting agents include the salts of condensation products of hydroxy or halogenated ethanesulfonic acids with amides or substituted amides of fatty acids or the salts of amides or substituted amides of fatty acids alone.

Another type of wetting agent which may be used as alkylation-promoting agent according to my invention is a salt of the sulfuric acid ester of aliphatic alcohols, such as sodium lauryl sulfate. Instead of sodium lauryl sulfate, other salts of alkyl sulfates may be used. Also, if desired, a combination of salts of various alkyl sulfates may be utilized as alkylation-promoting agents. The alkyl group of the wetting agent described above may be either saturated or unsaturated. Further, the hydrocarbon chain of the salts of alkyl sulfates preferably contains about 10 to 14 carbon atoms, or thereabouts.

It was pointed out previously that alkyl sulfates and alkyl acid sulfates in which the hydrocarbon chains were of the order of 3, 4, or 5 carbon atoms, or thereabouts, exhibited an inhibiting effect on alkylation of tertiary hydrocarbon saturates with olefins in the presence of activating sulfuric acid. However, it has been observed that alkyl sulfates containing, say, 10, 12 or 14 carbon atoms per molecule not only failed to exhibit an inhibiting effect, but on the other hand, acted as alkylation-promoting agents for my purpose. In other words, high molecular weight esters of sulfuric acid appear to exhibit an effect (i. e., promoting) which is just the reverse of that (i. e., inhibiting) shown by low molecular weight esters of the same type.

Olefinic hydrocarbons such as isobutylene, diisobutylene, tetraisobutylene, and the like, interact with saturated aliphatic hydrocarbons which contain a tertiary carbon atom of which isobutane and isopentane are examples, in the presence of activating sulfuric acid containing an alkylation-promoting agent. Or, if desired, the olefin reactant may be a straight chain compound. To illustrate, n-butylene (n-butene) or n-hexylene (n-hexene) may be employed in place of the iso-olefins such as those mentioned above.

Intimate contact of the hydrocarbon reactants with each other and with the activating sulfuric acid containing an alkylation-promoting agent aids both the completeness and degree of alkylation. Preferably, therefore, the reactants are kept in the liquid phase. This may be effected by lowering the temperature of reaction or by increasing the pressure, or both. In this way hydrocarbon reactants which are gases at atmospheric temperatures and pressures, e. g., isobutane, n-butylene, isobutylene and the like, may be maintained in the liquid phase while in contact with the activating sulfuric acid containing an alkylation-promoting agent and with each other. However, it is not necessary to maintain all reactants in the liquid phase. In some cases it may be desired to conduct alkylation operations with one hydrocarbon component in the liquid phase, and the other hydrocarbon component in the vapor phase. For example, a saturated hydrocarbon containing a tertiary carbon atom may be agitated with sulfuric acid containing an alkylation-promoting agent at a temperature and pressure at which the hydrocarbon will remain substantially in the liquid state. The gaseous olefin hydrocarbon then may be conducted in a slow stream through the mixture of activating sulfuric acid containing an alkylation-promoting agent and tertiary hydrocarbon saturate. Also, both tertiary hydrocarbon saturate and olefin may be maintained in the gaseous phase during alkylation. As an alternative procedure, the two reactants may be admixed in the gaseous phase and allowed to stream through an alkylation agent such as activating sulfuric acid containing an alkylation-promoting agent.

Again, a mixture of olefins, such as one containing propylene and butylene, may be an appropriate alkylating agent. Similarly, a mixture of two or more tertiary hydrocarbon saturates, e. g., isobutane and isopentane, may be employed if desired.

Instead of using the olefine in its monomeric form, I may employ its dimeric or trimeric isomer. The latter many times appear to give as good results as the monomer and being liquids at ordinary temperatures, are much easier to handle. Thus diisobutylene or triisobutylene oftentimes is a more convenient alkylating agent than isobutylene. Furthermore, the dimer or trimer seems to react, at least to a very substantial degree, in the presence of sulfuric acid containing an alkylation-promoting agent as if it were the monomer. Thus, diisobutylene and isobutane interact to furnish a very considerable yield of isooctanes and not mainly dodecanes as might be expected. In like manner, instead of using a mixture of olefinic hydrocarbons, e. g., propylene admixed with butylene, I may employ the co-polymer resulting from the interaction of such olefins.

The following mode of procedure indicates the general character of the alkylation operation. In each experiment 920 g. of sulfuric acid of 98% strength were placed in a reaction flask together with the substances being tested as accelerating or repressing agents, and the whole mixture cooled to about −15° C. Liquid isobutane amounting to 460 g. was added to the mixture and the composition stirred for a few minutes. Then 92 parts of diisobutylene having a boiling range from 102–105° C. were incorporated dropwise with vigorous agitation over a period of about 120 minutes. During the addition of the olefin the temperature of the bath surrounding the reaction flask was maintained at −16° to −14° C. When the addition of the diisobutylene was completed, the mass was stirred for twenty minutes and then allowed to warm slowly to room temperature.

The reaction products were transferred to a separatory device and the acid layer withdrawn. The hydrocarbon layer was washed with water, dilute aqueous solution of sodium carbonate and then again with water and finally dried over anhydrous sodium sulfate. The dried hydrocarbon layer was stripped of any unreacted isobutane which might be present, and afterwards subjected to fractional distillation, the portion boiling within the range of 100–130° C. being taken as the octane fraction.

Data given in the following table illustrate the inhibiting influence of a number of substances on the alkylation of isobutane with diisobutylene. Since the endeavor was made to obtain a good yield of octane stock, some emphasis is placed upon the production of this material. Alkylation-inhibiting substances include arsenious acid, boric acid, aluminum, and diisopropyl sulfate. The results included in Table I below indicate the repressing or inhibiting action of these agents both on the total yield of reaction products and on the yield of octanes.

*Table I*

| Inhibiting agent | Blank | Arsenious acid | Boric acid | Aluminum | Diisopropyl sulfate |
| --- | --- | --- | --- | --- | --- |
| Per cent by wt. of added compound | | 0.5 | 10 | 1 | 0.5 |
| Total yield of reaction products grams | 136.2 | 118.2 | 90.1 | 115.5 | 105.4 |
| Fraction boiling up to 100° C. grams | 21.5 | 17.3 | 6.6 | 15.1 | 12.4 |
| Fraction boiling from 100–130° C. grams | 56.3 | 45.7 | 19.2 | 41.0 | 31.6 |
| Fraction boiling from 130–175° C. grams | 25.7 | 12.8 | 12.8 | 20.4 | 10.8 |
| Fraction boiling above 175° C. grams | 32.7 | 42.4 | 51.5 | 39.0 | 50.6 |
| Yield of octane per cent | 30 | 24.4 | 10.2 | 22 | 16.9 |

It will be noted from a comparison of the total yields of reaction products that addition of any of the inhibiting agents disclosed above caused a decrease in the total yield of reaction product as compared with that secured when only 98% sulfuric acid (column 1) was used as activating agent. Further, it will be seen that the presence of the inhibiting agents also causes a decrease in the yield of octane stock.

Using the procedure described above for alkylation, a number of substances were found to have alkylation-promoting properties when added to the activating sulfuric acid. These alkylation-promoting agents included selenium, sulfur, aluminum chloride, sodium salts of condensation products of hydroxy or halogenated ethane sulfonic acids with the salts of substituted amides of fatty acids, as, for example, the material designated as Igepon T, $C_{17}H_{33}CON(CH_3)C_2H_4SO_3Na$ and sodium salts of sulfuric acid esters of high molecular weight aliphatic alcohols, such as the product known as Gardinol, the sodium salt of sulfated lauryl alcohol. The results included in Table II below indicate the alkylation-promoting action of the agents described above, both on the total yield of reaction products and on the yield of octanes.

In some cases the product is characterized by containing traces to minute quantities of sulfuric acid or its compounds. In other instances when it is formed in the presence of substantially poison-free sulfuric acid, the product likewise will be substantially poison-free. When elemental sulfur is the alkylation-promoting agent, however, it was found that a very small proportion of this element was present in the product. As a consequence, distillation of the hydrocarbon material (resulting from the interaction of, say, di-

*Table II*

| Aklylation-promoting agent | Blank | Selenium | Sulfur | Aluminum chloride | Igepon T | Gardinol |
|---|---|---|---|---|---|---|
| Per cent by wt. of added compound | | 1 | 2 | 7 | 0.2 | 1 |
| Total yield of reaction products......grams.. | 136.2 | 140.7 | 145.1 | 127.9 | 130.9 | 123.8 |
| Fraction boiling up to 100° C......grams.. | 21.5 | 27.5 | 32.1 | 28.9 | 24.9 | 28.7 |
| Fraction boiling from 100–130° C......grams.. | 56.3 | 67.8 | 62.6 | 63.2 | 63.7 | 60.1 |
| Fraction boiling from 130–175° C......grams.. | 25.7 | 18.5 | 23.9 | 13.6 | 17.5 | 13.3 |
| Fraction boiling above 175° C......grams.. | 32.7 | 28.2 | 26.5 | 22.2 | 24.8 | 21.7 |
| Yield of octane stock per cent.. | 30 | 26 | 33.2 | 34 | 34 | 32 |

Other temperatures than that mentioned in the above described general procedure may be employed in interacting open chain olefins with tertiary hydrocarbon saturates by means of activating sulfuric acid containing an alkylation-promoting agent. Thus, for example, in Table III are indicated results secured using the above described general procedure, except that the temperatures of alkylation were −25° and −30° C.

*Table III*

| Alkylation-promoting agent | Blank | Sulfur | Blank | Sulfur |
|---|---|---|---|---|
| Per cent by wt. of added compound | | 2 | | 2 |
| Temperature of reaction, ° C | −25 | −25 | −30 | −30 |
| Total yield of reaction products grams.. | 135.9 | 119.3 | 122.0 | 105.6 |
| Fraction boiling up to 100° C grams.. | 29.0 | 22.2 | 22.2 | 16.8 |
| Fraction boiling from 100 to 130° C grams.. | 43.9 | 49.9 | 37.2 | 40.9 |
| Fraction boiling from 130 to 175° C grams.. | 20.4 | 11.0 | 20.5 | 11.7 |
| Fraction boiling above 175° C grams.. | 42.6 | 36.2 | 42.1 | 36.2 |
| Yield of octane stock...per cent.. | 23 | 27 | 20 | 22 |

From an inspection of the data in Table II and Table III, it will be noted that addition of alkylation-promoting agents to the sulfuric acid substantially increases the yields of octanes. Further, a comparison of Table II and Table III with Table I clearly indicates the greatly increased yields of octanes secured with the aid of alkylation-promoting agents over those obtained when alkylation-inhibiting agents are present.

The alkylation process involved herein comprises reacting an open chain olefin with a tertiary hydrocarbon saturate (or paraffin hydrocarbon having a tertiary carbon atom) in the presence of activating sulfuric acid containing an alkylation-promoting agent such as those hereinbefore described. However, the alkylation operation is directed more particularly to the production of octane material by the process comprising essentially the interaction of a butene and isobutane in the presence of activating sulfuric acid containing an alkylation-promoting agent.

isobutylene and isobutane) may yield some fractions, particularly those of the higher boiling ranges, containing sulfur and/or its derivatives, e. g., hydrogen sulfide or mercaptans.

This condition, i. e., presence of sulfur or its derivatives, may be eliminated or at least to a large degree palliated, if desired, by subjecting the alkylation product to some refining treatment prior to distillation. Thus, the hydrocarbon material may be washed with an aqueous solution of an alkali sulfide (e. g., sodium sulfide), the latter uniting with elemental sulfur to form an oil-insoluble but water-soluble alkali polysulfide. Another modification comprises filtration of the liquid hydrocarbons through a bed of solid alkali or alkaline-earth sulfide whereby extraction of elemental sulfur may be accomplished. Still another procedure includes distillation of the entire product, or a portion thereof, say, the octane fraction and higher, under reduced pressure.

Alkylation-promoting agents suitable for my purpose, however, are not and should not be limited to those specifically described in the examples hereinbefore given. In addition to the substances mentioned, tellurium may be used as alkylation-promoting agent, as well as salts of a sulfonated or sulfated aliphatic hydrocarbon. The latter may be saturated or unsaturated, and may contain elements other than carbon and hydrogen in the aliphatic chain, as, for example, oxygen, nitrogen or sulfur. Any one of the latter elements or any one pair or all of them may be present in the aliphatic chain. Also, any combination of two or more of the alkylation-promoting agents disclosed herein may be employed.

It is, of course, in the light of the present disclosure, now feasible to make various modifications in the alklation operation wh'ch has been illustrated and described above. Although the reaction as described is brought about at atmospheric pressure, it is quite possible to use higher or lower pressures. When the higher pressure is used, a pressure vessel may be employed which permits raising of the temperature from that below 0° C., as illustrated here, to as high as 50° or 60° C., or higher, and thus bring the reacting mixture to a warm or even a hot condition, whereupon interaction takes place even more readily when activator-poisoning substances are not present. Also, when the reactants are in a warm or even a hot condition, interaction takes place even more readily when an alkylation-promoting agent is present.

Since the materials in question do not act at higher temperatures, such as 70° C., the temperature at which ordinary alkylation is frequently carried out, it is possible that there may be a critical temperature at which the promotion agents involved are active. This should lie somewhere between 70° C. and cold room temperature.

Reference in the specification to the various groups of the periodic table refers to the Mendelyeev Periodic Table; particularly with respect to the A and B designations, they are in accordance with the designations and arrangement of the elements in "The Periodic Series of Elements," Table 8, appearing in Mellor's "Modern Inorganic Chemistry," Revised Edition, by G. D. Parkes and J. W. Mellor, 1939, published by Longmans, Green and Company.

When used in the specification and claims, the terms "N-acyl taurines" and "sulfuric acid esters" are intended to include the simple salts as, for example, the sodium salts thereof.

What I claim is:

1. A process which comprises reacting isobutane with diisobutylene under alkylation reaction conditions in the presence of sulfuric acid of alkylating concentration, said acid containing an alkylation-promoting agent selected from the group of wetting agents consisting of high molecular weight N-acyl taurines, and sulfuric acid esters of high molecular weight aliphatic monohydric alcohols.

2. A process which comprises reacting isoparaffin with monoolefin under alkylation reaction conditions in the presence of sulfuric acid of alkylating concentration, said acid containing an alkylation-promoting agent selected from the group of wetting agents consisting of high molecular weight N-acyl taurines, and sulfuric acid esters of high molecular weight aliphatic monohydric alcohols.

3. A process which comprises reacting isoparaffin with olefin under alkylation reaction conditions in the presence of sulfuric acid of alkaylating concentration, said acid containing promotional amounts of a high molecular weight N-acyl taurine.

4. A process which comprises reacting isoparaffin with olefin under alkylation reaction conditions in the presence of sulfuric acid of alkylating concentration, said acid containing promotional amounts of a sulfuric acid ester of a high molecular weight aliphatic monohydric alcohol.

5. A process as in claim 1 wherein the diisobutylene is replaced by at least one $C_4$ monoolefin.

6. A process which comprises reacting isoparaffin with monoolefin under alkylation reaction conditions in the presence of sulfuric acid of alkylating concentration, said acid containing an alkyl ester of sulfuric acid, said ester having not less than 10 carbon atoms per molecule.

7. A process as in claim 6 wherein the sulfuric acid ester is a sulfuric acid ester of lauryl alcohol.

8. A process which comprises reacting isoparaffin with olefin under alkylation reaction conditions in the presence of sulfuric acid of alkylating concentration, said acid containing an N-acyl taurine present in promotional amounts.

9. A process as in claim 8 wherein the sulfuric acid contains promotional amounts of $C_{17}H_{35}CON(CH_3)C_2H_4SO_3Na$

CARLETON ELLIS.